United States Patent [19]

Hashiue

[11] 4,301,374
[45] Nov. 17, 1981

[54] SHUTTER SYSTEM FOR OPTICAL MULTI-LENS SCANNER

[75] Inventor: Masakazu Hashiue, Saitama, Japan

[73] Assignee: Fuji Photo Film Co., Ltd., Minami-ashigara, Japan

[21] Appl. No.: 95,138

[22] Filed: Nov. 16, 1979

[51] Int. Cl.³ .......................... G06K 7/10; G11B 7/00
[52] U.S. Cl. ..................................... 250/566; 250/568; 250/236; 369/109
[58] Field of Search ............... 250/566, 568, 570, 555, 250/234, 235, 236; 365/127; 179/100.3 V, 100.3 G, 100.3 Z; 369/109, 110

[56] References Cited

U.S. PATENT DOCUMENTS 3,919,698 11/1975 Bricot et al. ................... 250/566 X
4,105,926 8/1978 Reno et al. ...................... 250/566

Primary Examiner—David C. Nelms
Assistant Examiner—Edward P. Westin
Attorney, Agent, or Firm—Sughrue, Mion, Zinn, Macpeak & Seas

[57] ABSTRACT

An optical information storage system having a data record with control markings therein and an optical readout system including a scanner. The readout system uses a laser light source and focusing optics to direct the light onto the data record for modulation and subsequent readout of the modulated light. Shutter elements are interposed to intercept the transmission of light in response to control signals in the data. The shutter, of the electronic type such as lead lanthanum zirconate titanate, may be positioned either between the source of light and the scanner or between the data record and the readout.

9 Claims, 4 Drawing Figures

SHUTTER SYSTEM FOR OPTICAL MULTI-LENS SCANNER

BACKGROUND OF THE INVENTION

This invention relates to optical recording and more particularly to optical information storage systems utilizing multiple lens scanners.

Optical recording, and in particular optical digital recording is well known and established within the art. Essentially, optical recording is used for high density storage of binary information and therefore is a technique of digital recording. Essentially, each information bit is stored on a reocrd as a discrete direct image. This is contrasted to other techniques which utilize halographic transform images. Storage densities utilizing optical digital recording techniques are exceptionally high. They are facilitated by the use of short focal lenses and mechanical scanning devices. There are two basic categories in the ways that optical scanning is performed. One category is that the recording material is rotated while either the recording material or the short focal lens is translated. It has been reported, for example, in SPIE Proceeding Vol. 123 edited for Optical Storage Materials and Methods, p. 104 (1977), "An Optical Disc Data Recorder", R. McFarlane et al that a total information capacity of $10^{10}$ bits may be recorded on a 30 cm disc which is equivalent to that recorded on 60 magnetic tapes.

Another category of scanning method is that the short focal lens or lenses are rotated by being mounted on a rotating scanning disc while either the rotating scanning disc or the recording material is translated. It has been reported, for example in Optical Engineering, Vol. 15, No. 1, January/February 1976, "Optical Digital Recording", Russell et al that data densities in the range of $5 \times 10^7$ bits/cm$^2$ with data rates of $3 \times 10^7$ bits/sec. have been demonstrated. As reported, this data storage technique allows for storage on an area of approximately 1 in$^2$ of an optical record, all of the information contained in a typical reel of computer tape, such as 2500 feet in length with a reading rate of 1600 BPI.

Various digital encoding techniques are used in optical digital recording, a typical one being the differential pulse code modulation format (PCM) which is used for color television program material. Accordingly, optical digital recording finds one area of commercial feasibility in consumer prerecorded television programing. In such an area, a video record would be compact in size, simple to operate, and will offer low cost when compared with contemporary video tape recording systems.

A variety of scanner techniques are known and have been demonstrated in this technology. Typical of prior art optical digital recording systems are those described in a group of patents of J. T. Russell, U.S. Pat. Nos. 3,501,586, 3,624,284, 3,795,902 and 3,806,643. In that typical system utilized for digital recording or digital playback, a laser source generally used is a beam passing through a modulator and then reflected off a mirror before being directed onto a distributor unit. The distributor is located relative to a scanner wheel having a number of microscope objective lenses. In the system described in the prior art reported by Russell, the record element is held stationary during both recording and playback and the scanner element of both rotates and is translated across the stationary digital record.

As indicated, a distributor is utilized which is a four face mirror located at one end of the scanner shaft. The function of the mirror is to direct an input light beam to a proper rotating objective during an active part of the scan across the record.

The microscope objective lens focuses the input laser light beam precisely onto the record where by means of fiber optics disposed on the opposite side coupled to a detector readout occurs. That is, in one technique described in the prior art readout occurs by which diverging light transmitted through the record is collected by a bundle of fiber optics which are then fed to a photomultiplier tube. There are, however, other ways of reading out the record.

In another technique, a large area of the record can be illuminated and the optics are arranged to image the data field only onto a masked area which defines an individual field to be read. This technique is not deemed to be as efficient as the first one since the illuminating light energy is not efficiently used. In the second technique, by use of focusing with the microscope objectives a spot approximately the size of 1 bit is illuminated.

Although these prior art optical digital recording and playback systems have demonstrated a proof of concept efficiency, nevertheless problems exist which deteriorate the accuracy of data recovered during playback. One problem is that there exists a time period during the scanning operation when two objective lenses on the rotating scanner wheel will be simultaneously illuminated. This period occurs when a first lens on the scanner is reading the end of one track while, a second or following lens mounted on the scanner wheel is beginning its scan of a subsequent track. Accordingly, a light collector will tend to collect data from both locations and interference of readout will exist at this time portion. The problem of interference at the end portions of a digital data track during the time period when two microscope objectives illuminate portions of the record remains an area of continuing research in this technology.

SUMMARY OF THE INVENTION

Accordingly, it is an object of this invention to achieve more accurate playback of recorded data in an optical information storage system.

Another object of this invention is to eliminate interference which exists by simultaneous illumination of two lenses in a rotating scanner information storage system.

A further object of this invention is to define a technique of eliminating interference caused by the illumination of two lenses by the use of a light shutter system having a very fast response time. Still another object of this invention is to define a digital recorder/playback optical information storage system that eliminates interference at the ends of the record yet is simple and reliable.

These and other objects of this invention are achieved by using an electro-optic shutter that is positioned to operate in the light path in front or behind of a record to be scanned. The shutter element, when it is positioned in front of the record, is ultimately opened and closed to illuminate only portions of the record, that is to eliminate the problem of illumination of two distinct portions at the same time. In accordance with a preferred embodiment of this invention, the shutter is of the electro-optic type such as transparent lanthanum-modified lead zirconate titanate (PLZT) and may constitute a multiple number of shutter elements with the center or undistrubed data domain always remaining opened. The edge portions of the electro-optic shutter would be ultimately opened and closed to make timing sequence dependent on position of record scanning on a particular track.

The invention will be defined in greater detail with respect to the accompanying drawings and the description of the preferred embodiment which follows.

DESCRIPTION OF THE PREFERRED EMBODIMENT

Figure 1:
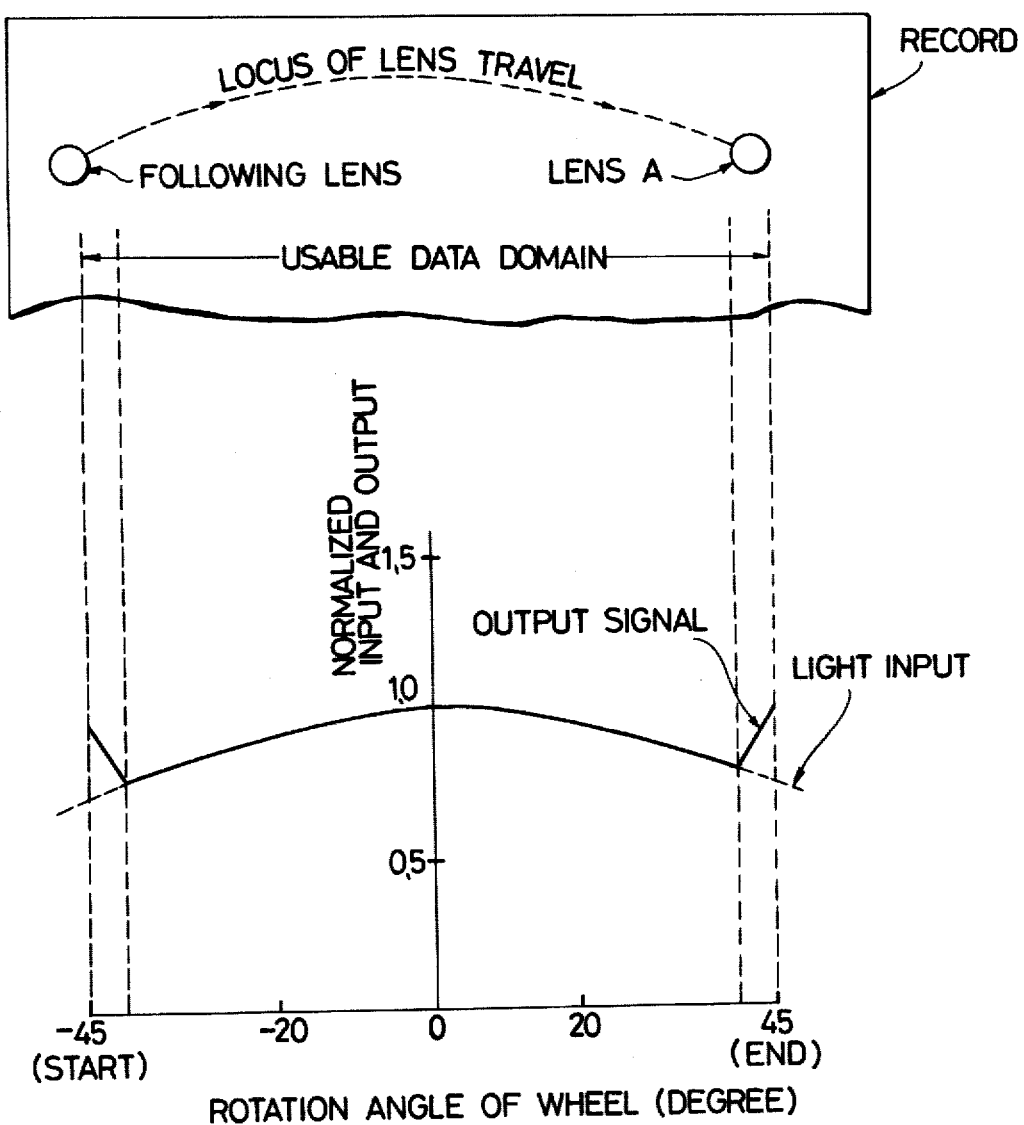
FIG. 1 is a chart showing variation in light input to, and the output signal from a readout unit plotted as a function of scan position.

Referring now to FIG. 1, a graph shows the relationship between variations in light input to, and the output signal from a readout unit plotted as a function of its scan position as a function of rotation angle. As indicated in the background section herein, this invention applies to a system utilizing a rotating scanner wheel having a number of objective lenses mounted for rotary scanning. Typically, four lenses are utilized.

The lenses sweep across a stationary record in an arcuate motion while in a synchronous manner the scanner wheel translates across that stationary record. The invention, however, is equally applicable with situation where scanner wheel rotates at a stationary position and the record is moved relative to that stationary point of rotation.

For purposes of explanation, it is assumed that a first lens denoted as lens A begins its sweep at the left hand portion of the graph at a position of −45 degrees and thereafter follows the locus of lens travel to a position at +45 degrees of wheel rotation angle. This is defined as a usable data domain. Within this space, digital data is read from the record by having the objective lens focus the laser beam onto a narrow pin point corresponding to an individual track for readout by means of the fiber optic bundle position on the opposite side of the record. As the lens begins its scan cycle across the record, if only one lens element is present, the light output signal would correspond to the light input signal shown as dotted lines extending from either end of the arcuate output signal plot. However, due to the position of the subsequent or following lens which is used to begin tracking at a point in time when the first lens reaches the end of its scan cycle, the output signal at edge portions of the usable data domain spikes. That is, an abrupt increase in the output signal occurs due to the fact that interference exists between the collective outputs of the lens A and the following or subsequent lens on the scanner wheel. This abrupt spike or increase in output signal is eliminated by the present invention.

Figure 2:
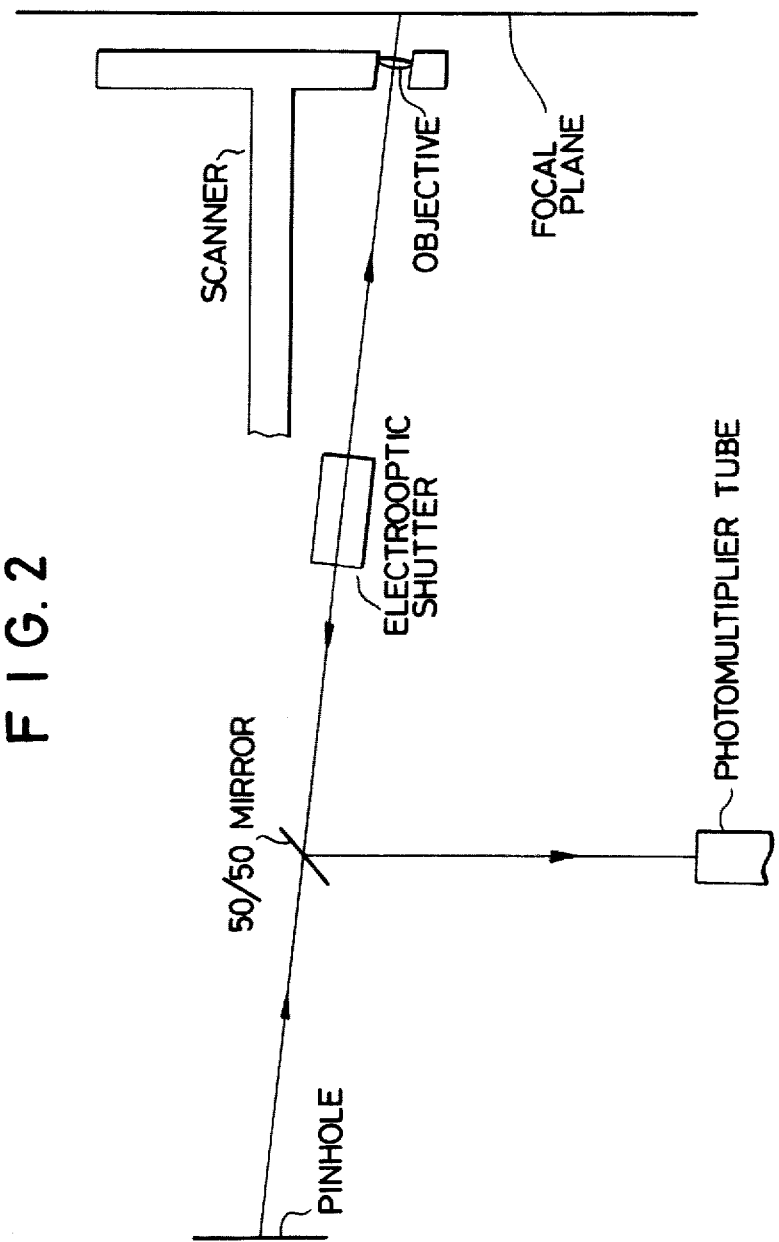
FIG. 2 is a schematic diagram showing a preferred position of the electro-optic shutter in the light path and its relationship to other essential elements in an optical digital recording system.

Referring now to FIG. 2, a schematic showing the principle of electro-optic shuttering in the context of optical digital recording is shown. It is, however, recognized that this invention is applicable to information recorded in analog format. In such a system, a beam of light typically, from a laser is provided through a pin hole and through a half transmitting mirror through the electro-optic shutter to an objective mounted on a rotating scanner. The light beam is then focused by the objective at a focal plane which exists on the surface of the digital record. As the objective scans the surface, light reflected by the surface is read by passing through the objective and the shutter and is reflected by the half mirror onto a photomultiplier tube. It is, however, recognized that this invention is applicable to transmissive readout.

As set forth in the description hereinabove, it is understood that the concept of utilizing a rotating scanner having a number of objectives to focus laser light onto a focal plane is known. In prior art patents, U.S. Pat. No. 3,624,284 and U.S. Pat. No. 3,891,894, synchronizing spots recorded in series with information spots are used to synchronize information spot stream. However, no consideration is given for the problem of interference of neighboring lenses at the edge of record scanning. In another prior art patent, U.S. Pat. No. 3,919,697, tracking information recorded in series with data stream is used to identify the tracks but no consideration is given for the problem of interference of neighboring lenses at the edge of record scanning. However, the specific problem of interference at the edge of record scanning has not been solved in such prior art systems. The present invention uses the electro-optic shutter. In such prior art systems, data readout typically occurs at a position behind the focal plane by means of a bundle of fiber optics. In the present system, readout can occur in that conventional manner or, as shown in the schematic view of FIG. 2 take place by means of a half reflecting mirror which reflects light onto the photomultiplier tube. In this manner, light reflected by the incident record surface is the readout technique. This type reflective readout is also well known in the art.

Figure 3:
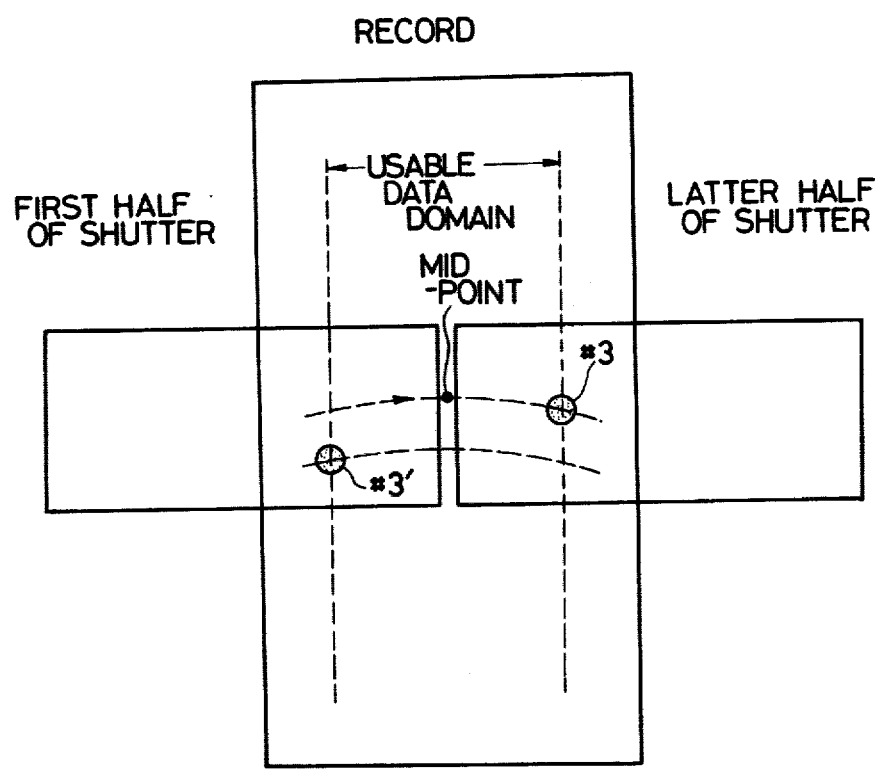
FIG. 3 is a schematic diagram showing the position of an electronic shutter with respect to a data record.

FIG. 3 shows the relationship between the data record and the shutter elements. Although as shown in FIG. 3, the shutter is made of two components, this is not crucial and similarly, it is not crucial that the shutter extend into the middle section of the usable data domain. The crucial requirement is that the shutter elements be positioned to cover the close neighbor data domains outside of the edge portions of the usable data domain in the regions shown as 3 and 3' to selectively and alternately open and close in those neighborhoods during record readout. As described with respect to FIG. 1, during the readout of the central portions, no problems exists with respect to interference. However, at some position one element of the shutter must be closed and the other opened to selectively screen the boarder areas. This can occur when the scan reaches the mid point or at any other position within the usable data domain.

As indicated herein, a suitable shutter material is lead lanthanum zirconate titanate (PLZT). This material is known in electro-optic shutter devices as reported in "PLZT electro-optic shutters: Applications" *Applied Optics*, Vol. 14, No. Aug. 1975, p. 1866; and "A PLZT Electro-optic Shutter Array", ISA 1979. Since the literature is replete with technical data on the construction of such shutter elements further disclosure is not needed.

Figure 4:
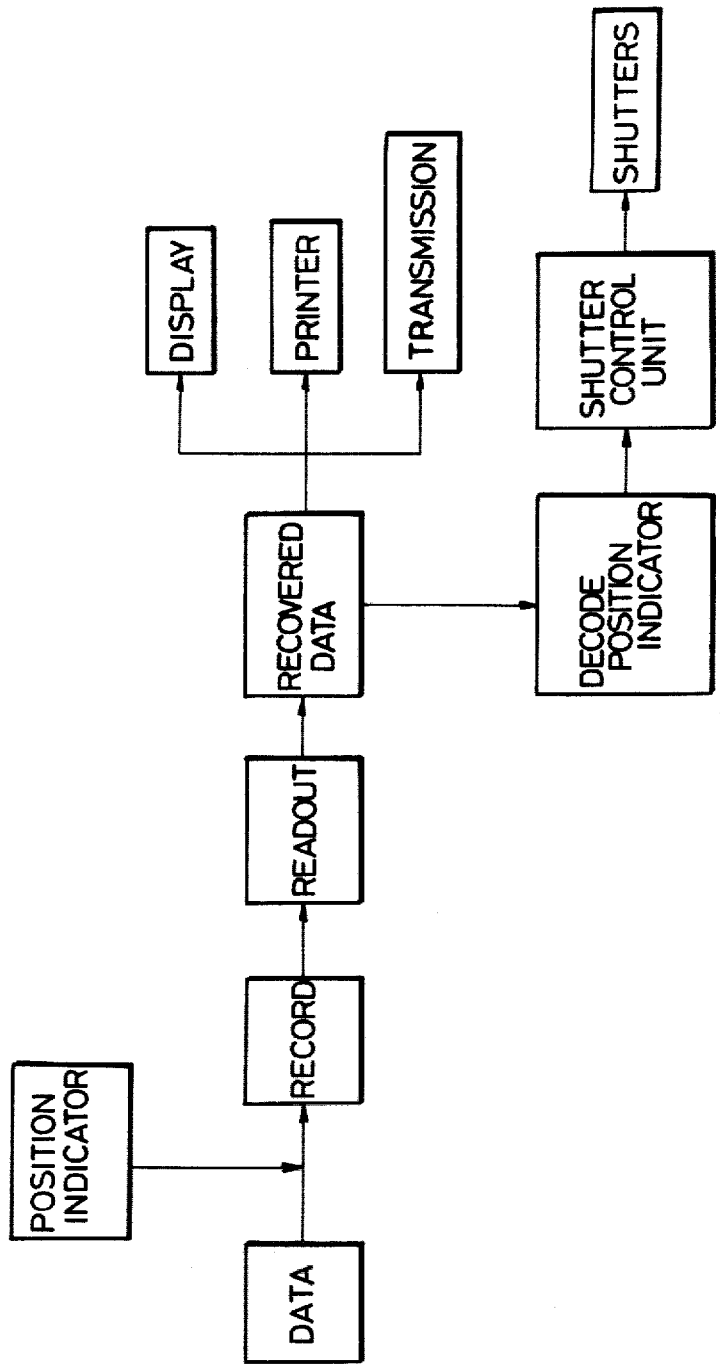
FIG. 4 is a schematic block diagram showing the essential elements utilized to control shutter operation and use of the recovered data.

Referring now to FIG. 4, a block diagram shows the elements which are utilized to control the shutter. This block diagram is a functional diagram which shows the preliminary steps established in the prior art of establishing a data format, recording it on a record utilizing a digital recorder and at some later time reading out the thus prerecorded record. As shown in FIG. 4, the recovered data can be used in a variety of modes. For example, the recovered data can be displayed as for use in television systems, it can be printed out or it can be retransmitted to another location.

In accordance with the utilization of such a system, this invention also applies to recording a code which shows specific mid point and end points on individual recorded tracks. Accordingly, a position indicator is used which selectively generates keys, that is the signals which are interposed in the data stream at various points which would indicate a point in a data track on a record. These signals are also interposed in the data track and indicate end points on individual tracks.

Position sensing using flag bits or other special signals in a data train is well established. During recordation of data these special signals are encoded during the period of the useable data domain. While such signals are preferably positioned at the end of each track, they can be placed anywhere so long as accurate timing for coordination of the shutter control results. The concept of using such flag bits in a data domain as a sensor to trigger some outside activity, such as reel reversal or shut-off in tape systems is well known. Likewise, decoding to obtain position indication from a recorded data train is well established in the art.

In the data recovery during readout, a decoder is used to indicate position on individual track. Such a decoder senses the position signals in the data readout to provide a real time indication of scan location on an individual track. The decoder output is fed to a shutter control unit which is used to selectively actuate the shutter elements. Hence, using decoder data the shutters are alternately opened and closed depending on position data such that no interference of beginning and end of track readout occurs. Accordingly, by use of such a system, the problem in the prior art of interference, when two lenses are simultaneously illuminated and no initially recorded information occurs outside the useable data domain due to the existence of threshold effect in response of the recording material to the recording illumination, is prevented.

As is indicated, the shutter may be made with any fast response material such as PLZT. Also, although a typical shutter having two elements is shown, the shutter may have a multiple number of parts and the center section may of course always be open since that is an area of valid data information.

Additionally, although FIG. 2 shows the shutter plates between the objective and the half mirror, it is apparent that the shutter can be placed anywhere in the light path. That is, it can be placed in front of the record as shown in FIG. 2 or behind the record, interposed between the record itself and the fiber optic bundle which is used to pick up the illumination which has been transmitted through the record.

Also, it is readily understood that because the shutter elements would be alternately switched, a shutter control unit is of simple construction and comprises high speed switching elements which are responsive to decode an information from the decode position indicator. Accordingly, the system offers a simple and reliable solution to the problem of reliable data playback in optical digital recorders.

While the invention has been described with respect to one preferred embodiment thereof, it is apparent that other modifications or changes may be made without departing from the essential scope of this invention.

What is claimed is:

1. In an optical information storage system having a data record and a scanner moving relatively to each other, the data record having a data train thereon, a source of light optic means to direct said light from said source to said scanner, said scanner focusing said light on said data train to be modulated by said data train, and readout means for recovering said modulated light, the improvement comprising; shutter means to interrupt the transmission of light and control means to selectively actuate said shutter means in response to signals in said data train.

2. The optical information storage system of claim 1 wherein said shutter means is interposed between said source of light and said scanner.

3. The optical information storage system of claims 1 or 2 wherein said shutter means is interposed between said optic means and said scanner.

4. The optical information storage system of claim 1 wherein said shutter means is interposed between said data record and said readout means.

5. The optical information storage system of claims 1, 2 or 4 wherein said control means comprises a decoder to determine the position of said scanner during a scan of a line of data on said data record and means to actuate said shutter in response to decoder output.

6. The optical information storage system of claims 1, 2 or 4 wherein said shutter comprises two elements placed to extend from end portions of said data record into a domain of useable data.

7. The optical information storage system of claim 6 wherein said shutter elements are lead lanthanum zirconate titanate.

8. The optical information storage system of claims 1, 2, or 4 wherein said shutter means comprises an electro-optic shutter.

9. The optical information storage system of claim 8 wherein said electro-optic shutter is lead lanthanum zirconate titanate.

* * * * *